United States Patent [19]

Kim et al.

[11] Patent Number: 5,434,241
[45] Date of Patent: Jul. 18, 1995

[54] BIODEGRADABLE POLY(LACTIC ACID)S HAVING IMPROVED PHYSICAL PROPERTIES AND PROCESS FOR THEIR PREPARATION

[75] Inventors: Young H. Kim; Kwang D. Ahn; Yang K. Han; Soo H. Kim; Jeong B. Kim, all of Seoul, Rep. of Korea

[73] Assignee: Korea Institute of Science and Technology, Seoul, Rep. of Korea

[21] Appl. No.: 171,641

[22] Filed: Dec. 22, 1993

[30] Foreign Application Priority Data

Apr. 24, 1993 [KR] Rep. of Korea ............... 93-6920

[51] Int. Cl.$^6$ .......................................... C08G 63/08
[52] U.S. Cl. ............................... 528/354; 525/415; 528/361
[58] Field of Search ............... 528/354, 357, 361; 525/415

[56] References Cited

U.S. PATENT DOCUMENTS 4,273,920 6/1981 Nevin .
5,225,521 7/1993 Spinu .................... 528/354

FOREIGN PATENT DOCUMENTS 56-14688 4/1981 Japan .
62-64823 3/1987 Japan .

OTHER PUBLICATIONS

Macromolecules, vol. 5, No. 4, Jul.-Aug. 1972, J. E. L. Roovers, et al., "Preparation and Characterization of Four-Branched Star Polystyrene", pp. 384–388.

*Primary Examiner*—Malvyn I. Marquis
*Assistant Examiner*—Shelley A. Dodson
*Attorney, Agent, or Firm*—Oblon, Spivak, McClelland, Maier & Neustadt

[57] ABSTRACT

This specification provides a biodegradable poly(lactic acid) of a star-shaped structure having a high molecular weight of more than 30,000 with excellent tensile strength and a process for its preparation which comprises direct polycondensation of lactic acid using polyhydroxyl compound having at least four hydroxyl groups.

12 Claims, No Drawings

BIODEGRADABLE POLY(LACTIC ACID)S HAVING IMPROVED PHYSICAL PROPERTIES AND PROCESS FOR THEIR PREPARATION

BACKGROUND OF THE INVENTION

1. Field of the Invention

The present invention relates to a biodegradable poly(lactic acid) having improved physical properties and a process for its preparation. More particularly, the present invention relates to a simple and economically efficient process for preparing a poly(lactic acid) having a high molecular weight in high yields which comprises direct polycondensation of lactic acid using a polyhydroxyl compound having at least four hydroxyl groups, and to a biodegradable poly(lactic acid) of a star-shaped molecular structure with a high molecular weight prepared by this process.

2. Description of the Prior Art

Lactic acid found in nature is nontoxic and harmless to animals, plants, and human beings. Poly(lactic acid)s, which are polymers of lactic acid, can be easily hydrolyzed in the presence of moisture. Due to these properties, poly(lactic acid)s have been used in biodegradable medical applications such as suturing threads or staples for surgery, sustained release polymers for drug delivery, etc., as well as in agricultural applications for soil treatment including herbicides, soil disinfectants, and the like.

In recent years, poly(lactic acid)s have attracted commercial interest for solving environmental pollution problems caused by plastic wastes. The application of poly(lactic acid)s have been extended for use as general-purpose biodegradable polymeric materials for packaging materials, food containers, coating materials, and so forth. The polymeric materials for these uses must have a high molecular weight in order to provide the desired strength to the resulting products.

A number of the processes for preparing a poly(lactic acid) having high molecular weights have been known in the art. For example, Japanese Patent Publication No. (Sho) 56-14,688 discloses a process for preparing a poly(lactic acid) which comprises condensating lactic acid to give an oligomer; pyrolizing the oligomer in the presence of a catalyst such as antimony oxide, antimony fluoride, stannous chloride, etc. to give a cyclic diester, and ring-open polymerizing the resulting diester in the presence of a catalyst such as stannous octoate, diethyl zinc, etc. However this process is complicated, and time and labor consumptive.

U.S. Pat. No. 4,273,920 discloses a process for preparing a poly(lactic acid) having a molecular weight of 6,000 to 30,000 which comprises polycondensation of lactic acid in the presence of a highly acidic ion exchange resin such as Dowex 50W (available from Dow Co.). One of the defects of this process is that a quantity of the solid catalyst (Dowex 50W) contained in the resulting polymer cannot be removed by any industrial purification techniques. In addition, the resulting polymer tends to be colored by the ion exchange resin used.

Japanese Laid-Open Patent Publication No. (Sho) 62-64823 describes a process for preparing a poly(lactic acid) having a molecular weight of about 10,000 which comprises polycondensating lactic acid in the presence of a fluid paraffin. This process is relatively simpler than that mentioned above, but it has a defect in that the resulting polymer has a low molecular weight and thus, shows poor physical properties which are not useful as a general-purpose biodegradable material.

SUMMARY OF THE INVENTION

It is therefore an object of the invention to provide a star-shaped poly(lactic acid)s having an average molecular weight of more than 30,000.

It is another object of the invention to provide an economically efficient, simple process for preparing poly(lactic acid)s which comprise direct polycondensation of lactic acid.

Further objects of the invention will become apparent through reading the remainder of the specification.

DETAILED DESCRIPTION OF THE INVENTION

We, the inventors of the invention, have intensively conducted a wide range of experiments in order to solve the problems encountered in the prior art techniques for preparing poly(lactic acid)s. As a result, we have unexpectedly discovered that a high molecular weight of poly(lactic acid)s can be advantageously produced by changing the molecular structure of poly(lactic acid) into a star-shape of polymer. The term "star-shape of polymers" means those polymers in which many polymeric chains are attached to a polyfunctional substance in a radial arrangement. This type of polymer has been known in the art and is reported to have a lower melting viscosity than that of linear chain polymers of the same molecular weight [See, J. E. L. Roovers, et al., Macromolecules, Vol. 5, 385 (1972)].

In general, the polycondensation of lactic acid proceeds stepwise in a similar manner to the esterification of a diacid with a diol. The molecular weight of the resulting polymer increases in proportion to the reaction time. During the polycondensation, an amount of water is produced as a by-product, which hydrolyzes the resulting polymer, and thus, decreases the molecular weight of the polymer. Therefore, it is very important to choose a method to remove the water formed effectively from the reaction system. A variety of dehydration techniques have been known which include, for example, increasing the stirring rate during the reaction, using much reduced pressure, and introducing a nitrogen gas flow. However, these techniques have fundamental limitations as a method to remove water, because the viscosity of the reaction system increases with the increase in the molecular weight of the resulting polymer. Therefore, it is a key point to reduce the viscosity of the reaction system as much as possible in order to obtain a high molecular weight of polymers. The poly(lactic acid)s in a star-shape, which show a lower melting viscosity, enable us to solve the problem of efficiently removing the water formed during the reaction.

In an aspect of the invention, a biodegradable poly(lactic acid) is provided which has a star-shaped molecular structure and a weight average molecular weight of above 30,000. The poly(lactic acid) of the invention shows a lower melting viscosity than that of a linear chain poly(lactic acid) having the same molecular weight.

In another aspect of the invention, a process for preparing a star-shape of poly(lactic acid) having a weight average molecular weight of more than 30,000 is provided, which comprises: mixing a polyhydroxyl compound, having at least four hydroxyl groups, with lactic acid; heating the resulting mixture under reduced pressure in the absence of a catalyst, while removing water, to give a poly(lactic acid) having a low molecular weight; and subjecting the poly(lactic acid) to direct polycondensation while heating under reduced pressure in the presence of a catalyst.

In principle, two processes are available for preparing a star form of poly(lactic acid) according to the invention, namely, a direct polymerization of lactic acid using a multi-functional reagent, and a two-step process comprising preparing a straight chain poly(lactic acid) followed by coupling. Among these, the former process is preferred to produce the star-shaped poly(lactic acid) according to the invention. The reaction mechanism for forming the star-like molecular structure of the invention depends on the difference in the reactivities of polyhydroxyl compounds and lactic acid used in the reaction. In the initial stage of the reaction, all primary hydroxyl groups of polyhydroxyl compounds are first reacted with lactic acid to form a small star-shaped structure. The molecular chains grow while maintaining their star-shaped structure by the subsequent reaction of lactic acid, resulting in the desired polymer in a star form having a high molecular weight of above 30,000.

The monomer, lactic acid, which can be used in the present invention, includes stereoisomers in a L- and D-form, and racemic form. Lactic acid may be used in the form of an aqueous solution of various concentrations, but it is advantageous to use a higher concentration for better operational efficiency. It is preferred to use an aqueous solution containing more than 80% of lactic acid. Alternatively, a lactic acid oligomer having a low molecular weight can be used as the starting material.

The dehydration according to the present invention can be carried out by adding a polyhydroxyl compound to lactic acid and heating the mixture in the absence of catalyst at 100° to 150° C. and 350 to 30 mmHg for at least 2 hrs, and usually 2 to 10 hrs. Preferably, the polycondensation is carried out stepwise for 5 to 6 hrs by increasing the temperature and reducing the pressure from 105° C. and 350 mmHg to 150° C. and 30 mmHg. The resulting poly(lactic acid) has a molecular weight ranging from 2,000 to 4,000.

The polycondensation can be carried out by heating the poly(lactic acid) having a low molecular weight under reduced pressure using a conventional catalyst such as antimony oxide. The reaction temperature is 150° to 250° C., preferably 150° to 200° C., and the pressure is 30 to 1 mmHg, but preferably 10 to 1 mmHg. The reaction time is at least 10 hrs, preferably 10 to 150 hrs, and even more preferably 10 to 100 hrs.

When using a lactic acid oligomer having a low molecular weight as the starting material, the polycondensation can be carried out at 150° to 200° C. and 10 to 1 mmHg for 10 to 150 hrs, but preferably 10 to 100 hrs.

Polyhydroxyl compounds used in the present invention are those having at least four hydroxyl groups. According to our repeated experiments, a polyhydroxyl compound having less than four hydroxyl groups cannot produce a well developed star-shaped structure of poly(lactic acid) results only in a polymer having low molecular weights. Either linear or cyclic polyhydroxyl compounds can be used in the process of the invention. The former is preferred. The representative examples of such linear polyhydroxyl compounds includes pentaerythritol, dipentaerythritol, tripentaerythritol, sorbitol, ribitol, poly(vinyl alcohol), poly(hydroxyethyl methacrylate), poly(hydroxypropyl methacrylate), and the like. In addition, it is preferred to use a polyhydroxyl compound in which each hydroxyl group is in primary position rather than in secondary position. For this reason, the most preferred polyhydroxyl compound is dipentaerythritol. The poly(lactic acid) resulting from the polycondensation of dipentaerythritol and lactic acid has a star-shaped structure with at least four branch chains. The cyclic polyhydroxyl compounds which can be used in the invention includes glucose, fructose, and the like.

The amount of polyhydroxyl compounds used in the polycondensation of the invention is 0.0001 to 10 wt %, and preferably 0.01 to 2 wt % based on the amount of the monomer to be used in the reaction. When the amount of the polyhydroxyl compound to be used is less than 0.01 wt %, a poly(lactic acid) having a low molecular weight is produced in which the desired star-shaped structure is insufficiently developed. On the other hand, if the amount of the polyhydroxyl compound to be used exceeds 2 wt %, it is difficult to stir the reaction mixture, and the polymer is cross-linked to form an elastic gum. The cross-linked poly(lactic acid) is not dissolved in a solvent even by heating, and thus cannot be further processed into a molded article. The polyhydroxyl compound can be added at either the dehydration of lactic acid step or the polycondensation step, but preferably during the dehydration step.

The polycondensation catalyst for lactic acid is known in the art. Any known catalyst can be used in the reaction. The representative examples of such catalysts include stannous chloride, stannous sulfate, stannous oxide, tetraphenyl tin, tin powder, isopropyltitanate, tetrachlorotitanate, antimony oxide, antimony chloride, lead oxide, calcium oxide, aluminium oxide, iron oxide, calcium chloride, zinc acetate, p-toluenesulponic acid, and so forth.

The catalyst can be used in an amount of 0.001 to 1 wt %, but preferably 0.01 to 1 wt % based on the amount of the lactic acid monomer. The catalyst is added at once or portionwise during the reaction.

The molecular weight of a polymer slowly increases upon initiation of the polymerization. The rate of increase for the molecular weight of the star-shaped poly(lactic acid) according to the invention is much faster than that of the corresponding linear poly(lactic acid). The molecular weight of a polymer is determined by measuring the solution viscosity of the reacted polymer removed at predetermined time intervals using a chloroform solution at 25° C.

The poly(lactic acid) according to the invention has a molecular weight of more than 30,000, and more specifically 30,000 to 100,000. The resulting polymer is colorless and nearly white. Such a high molecular weight range of the polymer according to the invention is a distinctive feature in view that the poly(lactic acid)s obtained by the conventional polycondensation techniques show a lower molecular weight, for example, less than 10,000. These results reveal that the process of the invention can produce a poly(lactic acid) having a higher molecular weight in a facile and economically efficient manner as compared with the prior art techniques.

The poly(lactic acid) according to the present invention shows an excellent tensile strength which is attributed to its high molecular weight. Thus, it can be widely used as a general-purpose biodegradable material, sustained release matrices for drug or agrochemical delivery, as well as films for agricultural use.

PREFERRED EMBODIMENT OF THE INVENTION

The present invention will be illustrated in greater detail by way of the following examples. The examples are presented for illustration purposes only and should not be construed as limiting the invention which is properly delineated in the claims.

EXAMPLE 1

150 g of a 90% aqueous L-lactic acid solution and 0.1 g of dipentaerythrytol (DIPET) were added to a 4-neck flask equipped with a thermometer, a condenser, and a $N_2$ introducing tube. The mixture was dehydrated by heating it in a nitrogen stream, while stepwise varying the temperature and the pressure from 105° C. and 350 mmHg to 150° C. and 30 mmHg. After removing about 38 g of water, 0.1 g of $Sb_2O_3$ were added. The resulting mixture was then polycondensated at an elevated temperature of 175° C. under a reduced pressure of 3 to 5 mmHg. The viscosity of the reaction system increased as the polycondensation proceeded. The molecular weight of the polymer was determined by measuring the solution viscosity of the reacted polymer. The changes in the molecular weight of the polymer at predetermined time intervals are listed in Table 2 below. After heating for 72 hrs under reduced pressure, 106 g of a colorless polymer were obtained. The molecular weight of the resulting polymer was found to be 49,000.

EXAMPLES 2-5

The same procedures as in Example 1 were repeated except that dipentaerythritol was used as the polyhydroxyl compound in various amount as illustrated in Table 1 below. The molecular weights of the resulting polymers are listed in Table 2 below.

TABLE 1

Effect of the amount of DIPET used

| Example No. | DIPET (g) | L-lactic acid | $Sb_2O_3$ (g) | Reaction Temp. (°C.)* |
|---|---|---|---|---|
| 2 | 0.01 | 150 | 0.1 | 175 |
| 3 | 0.25 | 150 | 0.1 | 175 |
| 4 | 0.5 | 150 | 0.1 | 175 |
| 5 | 3 | 150 | 0.1 | 175 |

*Polycondensation Temperature

EXAMPLE 6

Repeating the same procedures as in Example 1 except that 0.1 g of pentaerythritol were used as the polyhydroxyl compound, 104 g of a colorless polymer were obtained. The molecular weight of the resulting polymer was found to be 43,000.

EXAMPLE 7

Repeating the same procedures as in Example 1 except that 0.1 g of poly(hydroxymethyl methacrylate) were used as the polyhydroxyl compound, 103 g of a colorless polymer were obtained. The molecular weight of the resulting polymer was found to be 42,000.

EXAMPLE 8

Repeating the same procedures as in Example 1 except that 0.1 g of poly(hydroxypropyl methacrylate) were used as the polyhydroxyl compound, 101 g of a colorless polymer were obtained. The molecular weight of the resulting polymer was found to be 40,000.

EXAMPLE 9

Repeating the same procedures as in Example 1 except that 0.1 g of poly(vinyl alcohol) were used as the polyhydroxyl compound, 98 g of a colorless polymer were obtained. The molecular weight of the resulting polymer was found to be 35,000.

EXAMPLE 10

Repeating the same procedures as in Example 1 except that 0.1 g of tripentaerythritol were used as the polyhydroxyl compound, 100 g of a colorless polymer were obtained. The molecular weight of the resulting polymer was found to be 45,000.

COMPARATIVE EXAMPLE 1

150 g of a 90% aqueous L-lactic acid solution were added to a 4-neck flask equipped with a thermometer, a condenser, and a $N_2$ introducing tube. The mixture was dehydrated by heating it in a nitrogen stream, while stepwise changing the temperature and pressure from 105° C. and 350 mmHg to 150° C. and 30 mmHg. After removing about 38 g of water, 0.1 g of $Sb_2O_3$ were added. The reaction mixture was then polycondensated at an elevated temperature of 175° C. and a reduced pressure of 3 to 5 mmHg. The viscosity of the reaction system slowly increased as the polycondensation proceeded. The molecular weight of the polymer was determined by measuring the solution viscosity of the reacted polymer. The changes in the molecular weights of the polymer at predetermined time intervals are listed in Table 2 below. After heating for 72 hrs under reduced pressure, 95 g of a colorless polymer were obtained. The molecular weight of the resulting polymer was found to be 14,000.

COMPARATIVE EXAMPLE 2

150 g of a 90% aqueous L-lactic acid solution and 0.1 g of glycerol were added to a 4-neck flask equipped with a thermometer, a condenser, and a $N_2$ introducing tube. The mixture was dehydrated by heating it in a nitrogen stream, while stepwise changing the temperature and pressure from 105° C. and 350 mmHg to 150° C. and 30 mmHg. After removing about 38 g of water, 0.1 g of $Sb_2O_3$ were added. The reaction mixture was then polycondensated at an elecvated temperature of 175° C. under a reduced pressure of 3 to 5 mmHg. The viscosity of the reaction system slowly increased with the progress of the polycondensation. The molecular weight of the polymer was determined by measuring the solution viscosity of the polymer. The changes in the molecular weight of the polymer at predetermined time intervals are listed in Table 2 below. After heating for 72 hrs, 90 g of a deep yellowish polymer were obtained. The molecular weight of the resulting polymer was found to be 4,200.

TABLE 2

Molecular weights of poly(lactic acid) on polymerization time

| Example | 1 hr | 7 hr | 23 hr | 27 hr | 31 hr | 47 hr | 55 hr | 72 hr |
|---------|------|------|-------|-------|-------|-------|-------|-------|
| Ex. 1   | 3,500 | 6,100 | 13,000 | 16,400 | 20,600 | 35,000 | 39,000 | 49,000 |
| Ex. 2   | 3,000 | 4,200 | 9,300 | 11,000 | 12,000 | 14,500 | 15,500 | 16,000 |
| Ex. 3   | 3,000 | 14,000 | 41,000 | 55,000 | 79,000 | — | — | — |
| Ex. 4   | 3,500 | 9,100 | 28,000 | 31,000 | 35,000 | 46,000 | 47,000 | 68,000 |
| Ex. 5   | 4,000 | 13,000 | Cl* | Cl* | Cl* | Cl* | Cl* | Cl* |
| Ex. 6   | 5,000 | 8,000 | 14,000 | 17,000 | 20,000 | 32,000 | 38,000 | 43,000 |
| Ex. 7   | 3,000 | 5,500 | 12,000 | 14,500 | 19,000 | 28,000 | 35,000 | 42,000 |
| Ex. 8   | 3,200 | 5,700 | 12,500 | 15,000 | 18,000 | 26,000 | 33,000 | 40,000 |
| Ex. 9   | 2,900 | 5,500 | 11,500 | 14,000 | 17,500 | 25,000 | 30,000 | 35,000 |
| Ex. 10  | 3,000 | 6,500 | 13,000 | 17,000 | 23,000 | 32,000 | 39,000 | 45,000 |
| Com. Ex. 1 | 2,900 | 4,100 | 8,900 | — | 11,000 | — | — | 14,000 |
| Com. Ex. 2 | 3,000 | 3,800 | 5,000 | — | 4,600 | — | — | 4,200 |

Remarks: CL* = Cross-linked

What is claimed is:

1. A biodegradable poly(lactic acid) having a weight average molecular weight of more than 30,000 and a star-shaped molecular structure wherein at least four polymeric chains are attached to a polyhydroxyl compound chain thereof in a radial arrangement, wherein said biodegradable poly(lactic acid) is prepared by a process comprising the steps of:
   mixing a polyhydroxyl compound having at least four hydroxyl groups with lactic acid;
   heating the resulting mixture under reduced pressure of 350 to 30 mmHg at a temperature of 100° to 150° C. for at least two hours in the absence of a catalyst, to remove water to give a poly(lactic acid) having a low molecular weight; and
   subjecting the poly(lactic acid) to direct polycondensation, while heating at a temperature of 150° to 250° C. under reduced pressure of 30 to 1 mmHg for at least ten hours in the presence of a lactic acid polycondensation catalyst.

2. The poly(lactic acid) of claim 1, wherein the weight average molecular weight ranges from 30,000 to 150,000.

3. A process for preparing a poly(lactic acid) in a star-shaped structure having a weight average molecular weight of more than 30,000, which comprises the steps of:
   mixing a polyhydroxyl compound having at least four hydroxyl groups with lactic acid;
   heating the resulting mixture under reduced pressure of 350 to 30 mmHg at a temperature of 100° to 150° C. for at least two hours in the absence of a catalyst, to remove water to give a poly(lactic acid) having a low molecular weight; and
   subjecting the poly(lactic acid) to direct polycondensation, while heating at a temperature of 150° to 250° C. under reduced pressure of 30 to 1 mmHg for at least ten hours in the presence of a lactic acid polycondensation catalyst.

4. The process of claim 3, wherein the lactic acid is selected from the group consisting of L-lactic acid, D-lactic acid, DL-lactic acid, and lactic acid oligomer.

5. The process of any one of claim 3 to 4, wherein the polyhydroxyl compound is selected from the group consisting of pentaerythritol, dipentaerythritol, tripentaerythritol, sorbitol, ribitol, poly(vinyl alcohol), poly(hydroxyethyl methacrylate), poly(hydroxypropyl methacrylate), glucose, and fructose.

6. The process of claim 5, wherein the polyhydroxyl compound is pentaerythritol.

7. The process of claim 5, wherein the polyhydroxyl compound is dipentaerythritol.

8. The process of claim 5, wherein the polyhydroxyl compound is tripentaerythritol.

9. The process of claim 5, wherein the polyhydroxyl compound is poly(vinyl alcohol).

10. The process of claim 3, wherein the amount of polyhydroxyl compound to be used is 0.01 to 2 wt % based on the amount of the lactic acid monomer.

11. The process of claim 3, wherein the polycondensation is carried out at a temperature of 150° to 200° C. under pressure of 10 to 1 mmHg for between 10 and 100 hrs.

12. The process of claim 3, wherein the catalyst for polycondensation is selected from the group consisting of stannous chloride, stannous sulfate, stannous oxide, tetraphenyl tin, tin powder, isopropyltitanate, tetrachlorotitanate, antimony oxide, antimony chloride, lead oxide, calcium oxide, iron oxide, calcium chloride, zinc acetate, and p-toluenesulponic acid.

* * * * *